(12) United States Patent
Wang et al.

(10) Patent No.: US 12,335,722 B2
(45) Date of Patent: Jun. 17, 2025

(54) AUTHORIZATION AND POLICY PARAMETER CONFIGURATION METHOD, TERMINAL, AND NETWORK FUNCTION

(71) Applicant: VIVO MOBILE COMMUNICATION CO., LTD., Guangdong (CN)

(72) Inventors: Wen Wang, Guangdong (CN); Zhenhua Xie, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 368 days.

(21) Appl. No.: 17/891,186

(22) Filed: Aug. 19, 2022

(65) Prior Publication Data
US 2022/0400378 A1 Dec. 15, 2022

Related U.S. Application Data

(63) Continuation of application No. PCT/CN2021/078847, filed on Mar. 3, 2021.

(30) Foreign Application Priority Data

Mar. 4, 2020 (CN) .......................... 202010144447.1

(51) Int. Cl.
*H04W 12/06* (2021.01)
*H04W 8/24* (2009.01)
*H04W 40/22* (2009.01)

(52) U.S. Cl.
CPC ............. *H04W 12/06* (2013.01); *H04W 8/24* (2013.01); *H04W 40/22* (2013.01)

(58) Field of Classification Search
CPC . H04W 74/0833; H04W 74/08; H04W 12/06; H04W 12/08; H04W 12/61;
(Continued)

(56) References Cited

U.S. PATENT DOCUMENTS

| 11,889,391 B2 * | 1/2024 | Shan | ..................... H04W 12/08 |
| 2015/0029866 A1 * | 1/2015 | Liao | ..................... H04W 48/14 370/254 |

(Continued)

FOREIGN PATENT DOCUMENTS

| CN | 107852591 A | 3/2018 |
| CN | 109548008 A | 3/2019 |

(Continued)

OTHER PUBLICATIONS

Extended European Search Report for Application No. 21765378.1-1218, dated Jun. 29, 2023, 7 Pages.
(Continued)

*Primary Examiner* — Nathan S Taylor
(74) *Attorney, Agent, or Firm* — BROOKS KUSHMAN P.C.

(57) ABSTRACT

An authorization and policy parameter configuration method, a terminal, and a network function are provided. The method is applied to a terminal and includes: sending terminal-to-terminal relay communication capability information and/or a terminal policy container to a first network function; and receiving an authorization and policy parameter for relay communication sent by a second network function, where the authorization and policy parameter for relay communication is generated based on the relay communication capability information and/or the terminal policy container.

16 Claims, 8 Drawing Sheets

(58) Field of Classification Search
CPC ... H04W 28/0215; H04W 40/22; H04W 8/24; H04W 88/04; H04W 76/14; H04W 88/18; H04W 12/084; H04W 28/16; H04W 60/00; H04W 28/02; H04W 88/14; H04W 92/18; H04L 5/0007; H04L 5/0023; H04L 5/0044; H04L 5/0048; H04L 5/0053; H04L 5/00; H04L 63/108; H04L 63/20; H04L 9/40
USPC .......................................................... 455/439
See application file for complete search history.

(56) References Cited

U.S. PATENT DOCUMENTS

| | | | | |
|---|---|---|---|---|
| 2016/0381720 | A1* | 12/2016 | Baek .................. | H04W 8/14 370/329 |
| 2018/0278469 | A1* | 9/2018 | Gandhi ............... | H04L 12/2869 |
| 2019/0098537 | A1* | 3/2019 | Qiao ................... | H04W 36/10 |
| 2019/0349951 | A1* | 11/2019 | Ahmad ................ | H04W 76/14 |
| 2020/0053547 | A1* | 2/2020 | Baek .................. | H04W 8/005 |
| 2020/0068385 | A1* | 2/2020 | Yu ...................... | H04L 45/38 |
| 2020/0344359 | A1* | 10/2020 | Sun .................... | H04W 8/20 |
| 2021/0226850 | A1* | 7/2021 | Xu ..................... | H04W 4/24 |
| 2022/0103987 | A1* | 3/2022 | Shan ................... | H04W 4/40 |
| 2023/0029714 | A1* | 2/2023 | Xu ..................... | H04L 12/1407 |
| 2024/0357464 | A1* | 10/2024 | Lv ..................... | H04W 60/00 |

FOREIGN PATENT DOCUMENTS

| | | | | |
|---|---|---|---|---|
| CN | 110049485 | A | | 7/2019 |
| CN | 110099423 | A | | 8/2019 |
| CN | 110169097 | A | | 8/2019 |
| EP | 3038391 | A1 | | 6/2016 |
| WO | 2019067971 | A1 | | 4/2019 |
| WO | WO-2020223629 | A1 * | 11/2020 | ............... H04B 7/15 |
| WO | WO-2021138165 | A1 * | 7/2021 | ............ H04W 4/021 |

OTHER PUBLICATIONS

InterDigital Inc. "New Solution on Service Authorization, Provisioning for UE-to-NW relay" SA WG2 Meeting #136AH, Incheon, KR, Jan. 2020, S2-2001432, 3 Pages.
First Office Action for Japanese Application No. 2022-551619, dated Sep. 19, 2023, 3 Pages.
InterDigital Inc. "Solution for KI #3: Support of UE-to-Network Relay" SA WG2 Meeting #136, Reno, USA, Nov. 2019, 82-1911798, 6 Pages.
Intel "Clarification on V2X Policy and Parameter Provisioning related aspects" SA WG2 Meeting #137E, Electronic Meeting, Feb. 2020, S2-2001979, 5 Pages.
Samsung "Security policy for NR PC5" 3GPP TSG-SA3 Meeting #98e, e-meeting, Mar. 2020, S3-200170, 2 Pages.
Second Office Action for Japanese Application No. 2022-551619, dated Feb. 6, 2024, 3 Pages.
Intel, et al. "UE triggered UE policy provisioning procedure" 3GPP TSG-SA WG2 Meeting #130, Kochi, India, Jan. 2019, S2-1900425, 3 Pages.
First Office Action for Chinese Application No. 202010144447.1, dated Feb. 8, 2022, 17 Pages.
Second Office Action for Chinese Application No. 202010144447.1, dated Aug. 3, 2022, 16 Pages.
International Search Report and Written Opinion for Application No. PCT/CN2021/078847, dated May 24, 2021, 8 Pages.
3GPP, "3rd Generation Partnership Project; Technical Specification Group Services and System Aspects; Procedures for the 5G System; Stage 2 (Release 15)," 3GPP TS 23.502, Jun. 2018, V15.2.0, 308 Pages.
Intel, "Update to Solution #14," 3GPP TSG SA WG2 Meeting #128BIS, Agenda item 6.7, Aug. 20-24, 2018, S2-188005 (revision of S2-18xxxx), Sophia Antipolis, France, 3 Pages.
Catt, "Service Authorization and Provisioning Based on Ue V2X Capability," SA WG2 Meeting #128bis, Agenda item 6.6, Aug. 20-24, 2018, S2-188160 (revision of S2-18xxxx), Sophia Antipolis, France, 3 Pages.
InterDigital Inc., "Solution for Key Issue #4 Support of UE-to-UE Relay," SA WG2 Meeting #136AH, Agenda item 8.6, Jan. 13-17, 2020, S2-2000906 (revision of S2-19xxxx), Incheon, Korea, 2 Pages.

* cited by examiner

AUTHORIZATION AND POLICY PARAMETER CONFIGURATION METHOD, TERMINAL, AND NETWORK FUNCTION

CROSS-REFERENCE TO RELATED APPLICATIONS

This application is a continuation of PCT International Application No. PCT/CN2021/078847 filed on Mar. 3, 2021, which claims priority to Chinese Patent Application No. 202010144447.1, filed on Mar. 4, 2020, which are incorporated herein by reference in their entireties.

TECHNICAL FIELD

The present invention relates to the field of communications technologies, and in particular, to an authorization and policy parameter configuration method, a terminal, and a network function.

BACKGROUND

With the development of some new forms of devices or some new technologies, new services for people to exchange information and play games become increasingly popular, namely, network controlled interactive services (NCIS). Many interactive services, such as family gatherings or entertainment in bars, take place in local areas. Requirements for throughput, latency, reliability, and resource or power utilization can be enhanced by means of specific direct links or indirect links between users.

In order to further satisfy requirements of the NCIS services, a user equipment (UE)-to-UE relay connection is further introduced into a 5G scenario. The 5G proximity services (ProSe) project also clearly specifies the need to support a UE-to-UE relay mechanism. In order to satisfy the UE-to-UE relay mechanism, it is required to deal with the problem of authorization and policy parameter configuration in UE-to-UE relay communication; otherwise, terminals cannot establish a relay connection and cannot perform UE-to-UE relay communication that satisfies a security mechanism.

SUMMARY

According to a first aspect, an embodiment of the present invention provides an authorization and policy parameter configuration method, applied to a terminal, where the method includes:
  sending terminal-to-terminal relay communication capability information and/or a terminal policy container to a first network function; and
  receiving an authorization and policy parameter for relay communication sent by a second network function, where the authorization and policy parameter for relay communication is generated based on the relay communication capability information and/or the terminal policy container.

According to a second aspect, an embodiment of the present invention further provides an authorization and policy parameter configuration method, which is applied to a first network function. The method includes:
  receiving terminal-to-terminal relay communication capability information and/or a terminal policy container; and
  sending the relay communication capability information and/or the terminal policy container to a second network function.

According to a third aspect, an embodiment of the present invention further provides an authorization and policy parameter configuration method, which is applied to a second network function. The method includes:
  receiving relay communication capability information and/or a terminal policy container from a terminal;
  generating an authorization and policy parameter for relay communication; and
  sending the authorization and policy parameter for relay communication to the terminal through a terminal configuration update process.

According to a fourth aspect, an embodiment of the present invention further provides a terminal, including:
  a first sending module, configured to send terminal-to-terminal relay communication capability information and/or a terminal policy container to a first network function; and
  a first receiving module, configured to receive an authorization and policy parameter for relay communication sent by a second network function, where the authorization and policy parameter for relay communication is generated based on the relay communication capability information and/or the terminal policy container.

According to a fifth aspect, an embodiment of the present invention further provides a network function, which is a first network function. The network function includes:
  a second receiving module, configured to receive terminal-to-terminal relay communication capability information and/or a terminal policy container; and
  a second sending module, configured to send the relay communication capability information and/or the terminal policy container to a second network function.

According to a sixth aspect, an embodiment of the present invention further provides a network function, which is a second network function. The network function includes:
  a third receiving module, configured to receive relay communication capability information and/or a terminal policy container from a terminal;
  a parameter generation module, configured to generate an authorization and policy parameter for relay communication; and
  a third sending module, configured to send the authorization and policy parameter for relay communication to the terminal through a terminal configuration update process.

According to a seventh aspect, an embodiment of the present invention further provides a terminal, including: a memory, a processor, and a computer program stored on the memory and executable on the processor. When the computer program is executed by the processor, the steps of the foregoing authorization and policy parameter configuration method are implemented.

According to an eighth aspect, an embodiment of the present invention further provides a network function, including: a memory, a processor, and a computer program stored on the memory and executable on the processor. When the computer program is executed by the processor, the steps of the foregoing authorization and policy parameter configuration method are implemented.

BRIEF DESCRIPTION OF DRAWINGS

In order to illustrate the technical solutions of the embodiments of the present invention more clearly, the following briefly describes the accompanying drawings for describing the embodiments of the present invention. Apparently, the accompanying drawings in the following description show merely some embodiments of the present invention, and those of ordinary skill in the art can obtain other drawings from these accompanying drawings without any creative efforts.

DETAILED DESCRIPTION

To make the objectives, technical solutions, and advantages of the present invention clearer, the present invention is described in detail below with reference to the accompanying drawings and the specific embodiments.

In view of the problem of authorization and policy parameter configuration in UE-to-UE relay communication in the prior art, the present invention provides an authorization and policy parameter configuration method, a terminal, and a network function.

Figure 1:
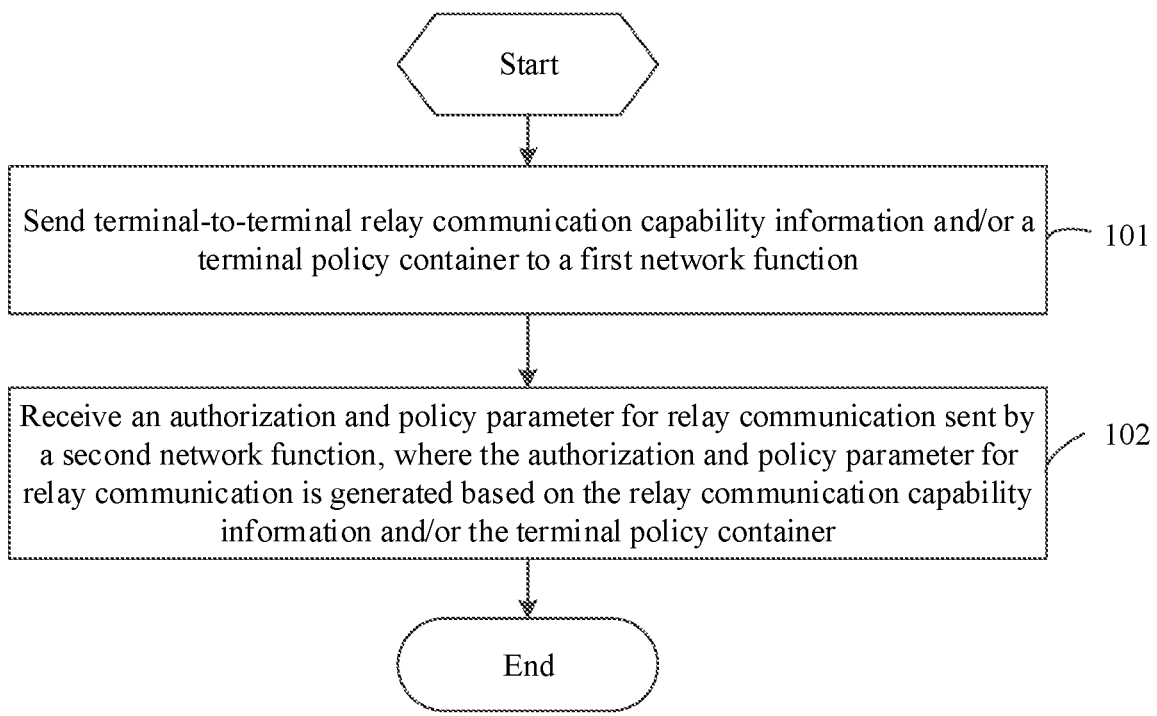
FIG. 1 is a schematic flowchart 1 of an authorization and policy parameter configuration method according to an embodiment of the present invention.

As shown in FIG. 1, an embodiment of the present invention provides an authorization and policy parameter configuration method, which is applied to a terminal. The method includes the following steps.

Step 101: Send terminal-to-terminal relay communication capability information and/or a terminal policy container to a first network function.

The first network function may be an access and mobility management function (AMF). The AMF may determine, based on the relay communication capability information and/or the terminal policy container provided by a terminal, and subscription information of the terminal, whether the terminal authorizes UE-to-UE relay communication. After the authorization from the terminal is successful, the AMF sends the relay communication capability information and/ or the terminal policy container to a second network function, where the second network function may be a policy control function (PCF).

Step 102: Receive an authorization and policy parameter for relay communication sent by the second network function, where the authorization and policy parameter for relay communication is generated based on the relay communication capability information and/or the terminal policy container.

The second network function generates the authorization and policy/parameter for the UE-to-UE relay communication of the terminal based on the subscription information of the terminal, and the relay communication capability information and/or the terminal policy container provided by the terminal, and provides the authorization and policy/parameter to the terminal through a UE configuration update process.

In the embodiments of the present invention, the terminal provides the terminal-to-terminal relay communication capability information to the network function, so that the network function determines the authorization and policy parameter for relay communication based on the relay communication capability information. Through an authorization and policy/parameter configuration for relay communication, the terminal can perform authorized discovery and connection establishment for a UE-to-UE relay based on the authorization and policy/parameter configuration.

Optionally, the terminal may provide the relay communication capability information to the first network function by using a registration request message. Specifically, step 101 includes: sending a registration request message to the first network function, where the registration request message carries the relay communication capability information, and the relay communication capability information includes: capability information indicating that the terminal is capable of serving as a relay terminal, and/or capability information indicating that the terminal is capable of performing relay communication.

In a registration process, the terminal provides UE-to-UE relay communication capability information to the first network function, such as the AMF. For UE-to-UE relay UE in UE-to-UE relay communication, the registration request message carries capability information indicating that the terminal is capable of serving as the UE-to-UE relay UE. For non-UE-to-UE relay UE in UE-to-UE relay communication, the registration request message needs to carry capability information indicating that the terminal is capable of performing the UE-to-UE relay communication.

Optionally, the registration request message further carries the terminal policy container; and the terminal policy container carries terminal-to-terminal relay communication policy or parameter indication information.

If the terminal does not currently have an available authorization and policy parameter for the UE-to-UE relay communication, for example, the authorization or policy parameter for the relay communication is lost or invalid due to other exceptions, or an authorization or policy parameter timer for the relay communication expires, the terminal may include, in the registration request message, a UE policy container carrying a UE-to-UE relay communication indication, to request the authorization and policy parameter for relay communication from the network function.

Figure 2:
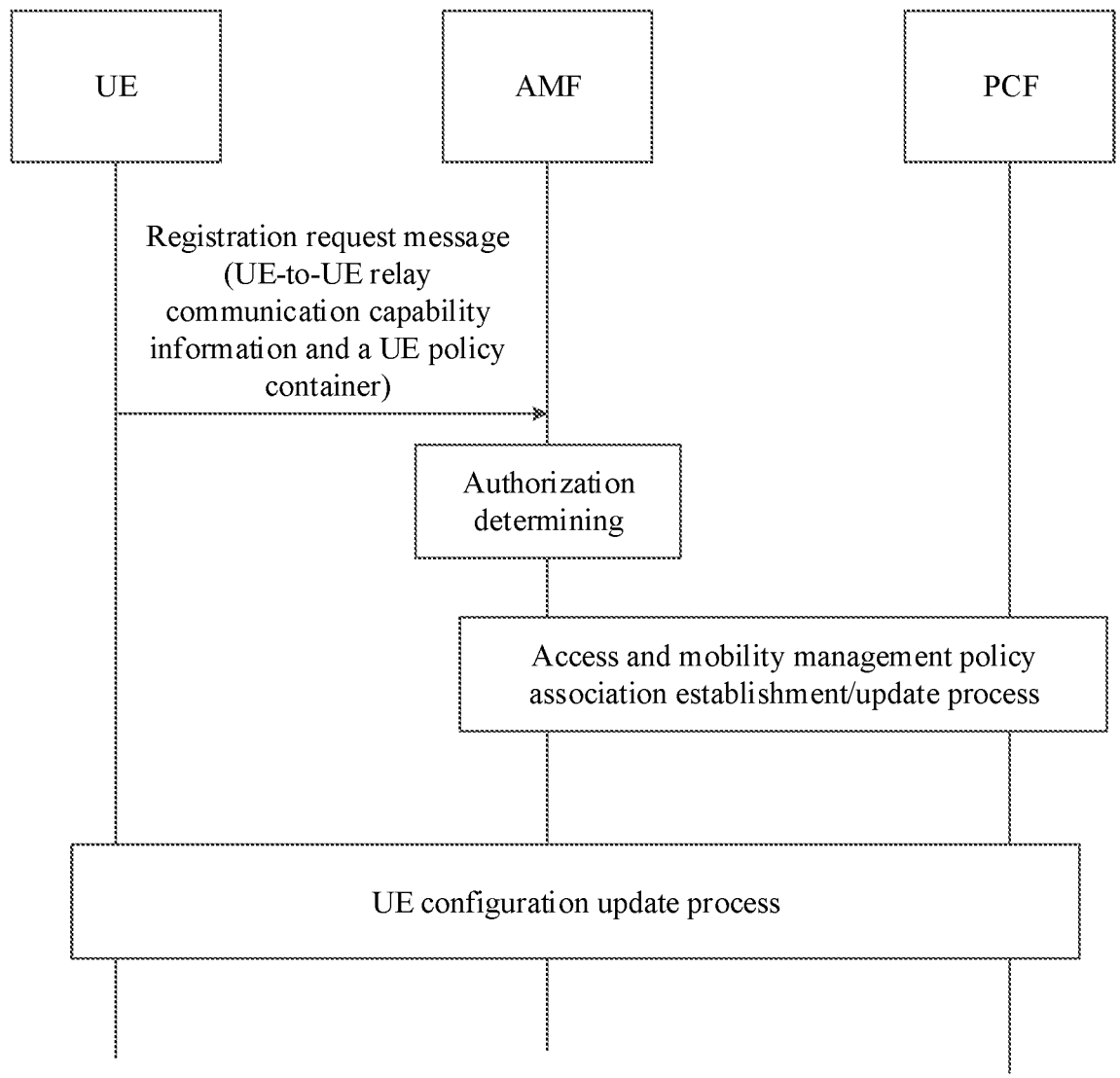
FIG. 2 is a schematic flowchart 2 of an authorization and policy parameter configuration method according to an embodiment of the present invention.

As shown in FIG. 2, the terminal sends the registration request message to the first network function, where the registration request message includes UE-to-UE relay communication capability information, and the registration request message may further include a UE policy container.

After the first network function (AMF) receives the registration request message from the terminal, the AMF performs authorization determining based on subscription information of the UE, that is, determines whether the UE authorizes UE-to-UE relay communication. For UE-to-UE relay UE, the AMF further needs to determine, based on the subscription information, whether the UE-to-UE relay UE can be authorized to be UE-to-UE relay UE. After the authorization is successful, the AMF stores the relay communication capability information reported by the terminal and the subscription information into a UE context. The AMF provides the relay communication capability information to the second network function (PCF) in an access and mobility management policy association establishment/update process. If the UE policy container carrying the UE-to-UE relay communication indication is included, the AMF also provides the UE policy container to the PCF in the process. The PCF generates the authorization and policy parameter for the UE-to-UE relay communication of the UE based on the relay communication capability information provided by the AMF, the UE policy container carrying the UE-to-UE relay communication indication, and the subscription information of the UE, and provides the authorization and policy parameter to the UE through a UE configuration update process.

Optionally, when the terminal does not have a valid authorization and policy parameter for the UE-to-UE relay communication, the terminal initiates an authorization and policy/parameter configuration process for the UE-to-UE relay communication. Specifically, step 101 includes:

when a trigger condition is satisfied, sending a policy configuration request message to the first network function, where the policy configuration request message carries the terminal policy container; and the terminal policy container carries terminal-to-terminal relay communication policy or parameter indication information.

The trigger condition may include at least one of the following:

an authorization and policy parameter timer for the terminal-to-terminal relay communication of the terminal expires; or an authorization and policy parameter for the terminal-to-terminal relay communication of the terminal is invalid, for example, is lost or invalid due to other exceptions.

Figure 3:
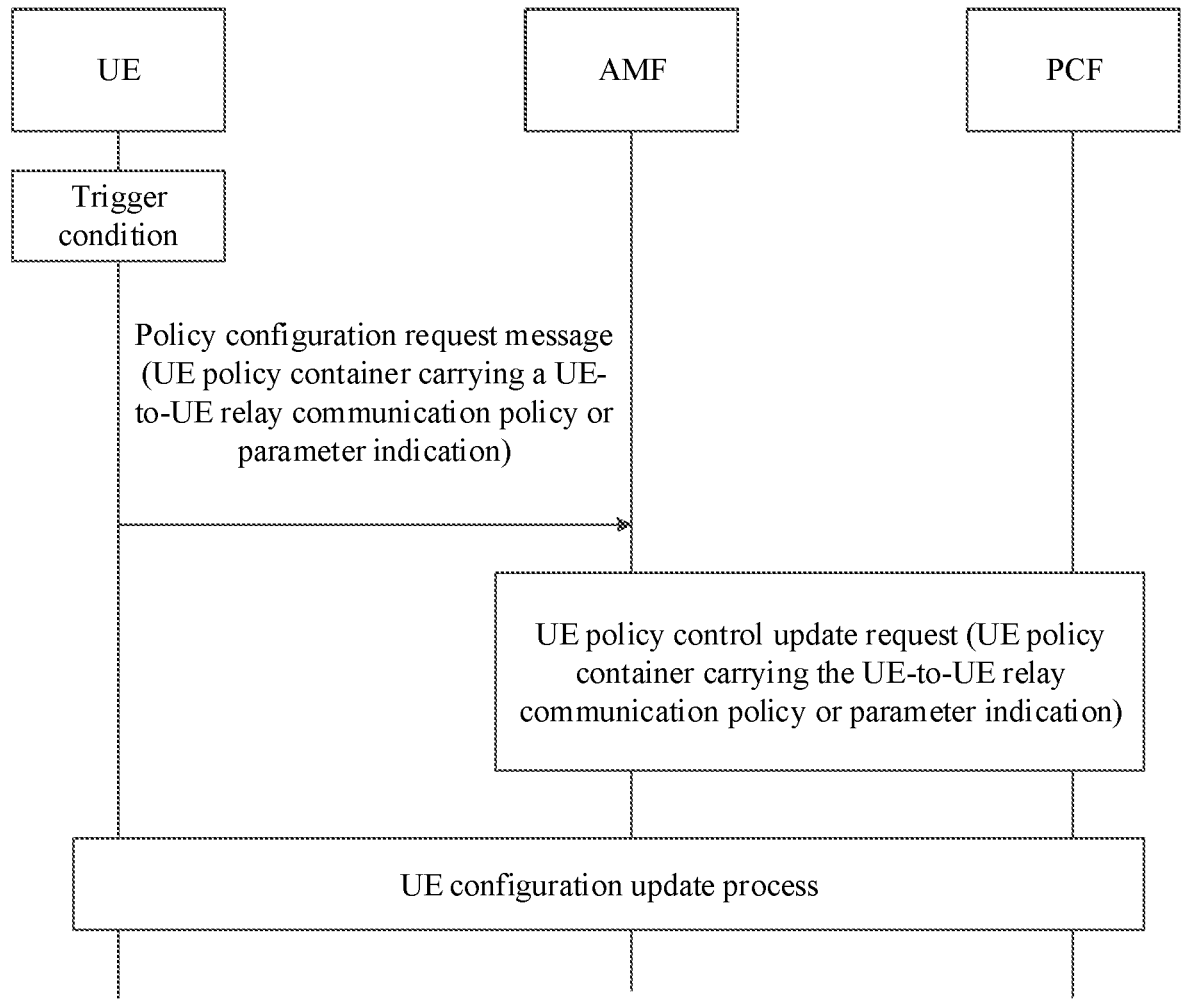
FIG. 3 is a schematic flowchart 3 of an authorization and policy parameter configuration method according to an embodiment of the present invention.

In this embodiment, as shown in FIG. 3, when the trigger condition is satisfied, the UE may include the UE policy container carrying the UE-to-UE relay communication policy/parameter indication in the policy configuration request message, and send the policy configuration request message to the first network function (AMF). The AMF sends the UE policy container carrying the UE-to-UE relay communication policy/parameter indication to the second network function (PCF) by using a UE policy control update request. The PCF generates the authorization and policy parameter for the UE-to-UE relay communication of the UE based on the subscription information of the UE and the terminal policy container, and provides the authorization and policy parameter to the UE through a UE configuration update process.

Specifically, for the UE-to-UE relay UE in the UE-to-UE relay communication, that is, when the terminal is a relay terminal, the authorization and policy parameter for relay communication may include at least one of the following:

(a) an authorization policy for serving as a terminal-to-terminal relay, such as public land mobile network (PLMN) information for authorizing as the relay UE for the UE-to-UE relay communication;

(b) a terminal-to-terminal relay discovery policy or parameter, such as a UE-to-UE relay service code or service identifier for identifying a connection service provided by the UE-to-network relay;

(c) a terminal-to-terminal relay communication policy or parameter, such as a quality of service (QoS) parameter for the UE-to-UE relay communication; or (d) a security parameter in the terminal-to-terminal relay communication, including security parameter information in a UE-to-UE relay discovery process and a UE-to-UE relay communication connection establishment process.

Specifically, for the non-relay UE (a source terminal or a destination terminal) in the UE-to-UE relay communication, that is, when the terminal is a non-relay terminal, the authorization and policy parameter for relay communication may include at least one of the following:

(a) an authorization policy for enabling terminal-to-terminal relay communication, such as PLMN information for authorizing the UE-to-UE relay communication;

(b) a terminal-to-terminal relay discovery policy or parameter, such as a UE-to-UE relay service code or service identifier;

(c) a terminal-to-terminal relay communication policy or parameter, such as a QoS parameter for the UE-to-UE relay communication;

(d) a selection policy for a relay terminal in the terminal-to-terminal relay communication, for selection and reselection of the relay UE in the UE-to-UE relay discovery or UE-to-UE relay communication; or (e) a security parameter in the terminal-to-terminal relay communication, including security parameter information in a UE-to-UE relay discovery process and a UE-to-UE relay communication connection establishment process.

In this embodiment of the present invention, the terminal provides the terminal-to-terminal relay communication capability information to the network function, so that the network function determines the authorization and policy parameter for relay communication based on the relay communication capability information. Through an authorization and policy/parameter configuration for relay communication, the terminal can perform authorized discovery and connection establishment for a UE-to-UE relay based on the authorization and policy/parameter configuration.

Figure 4:
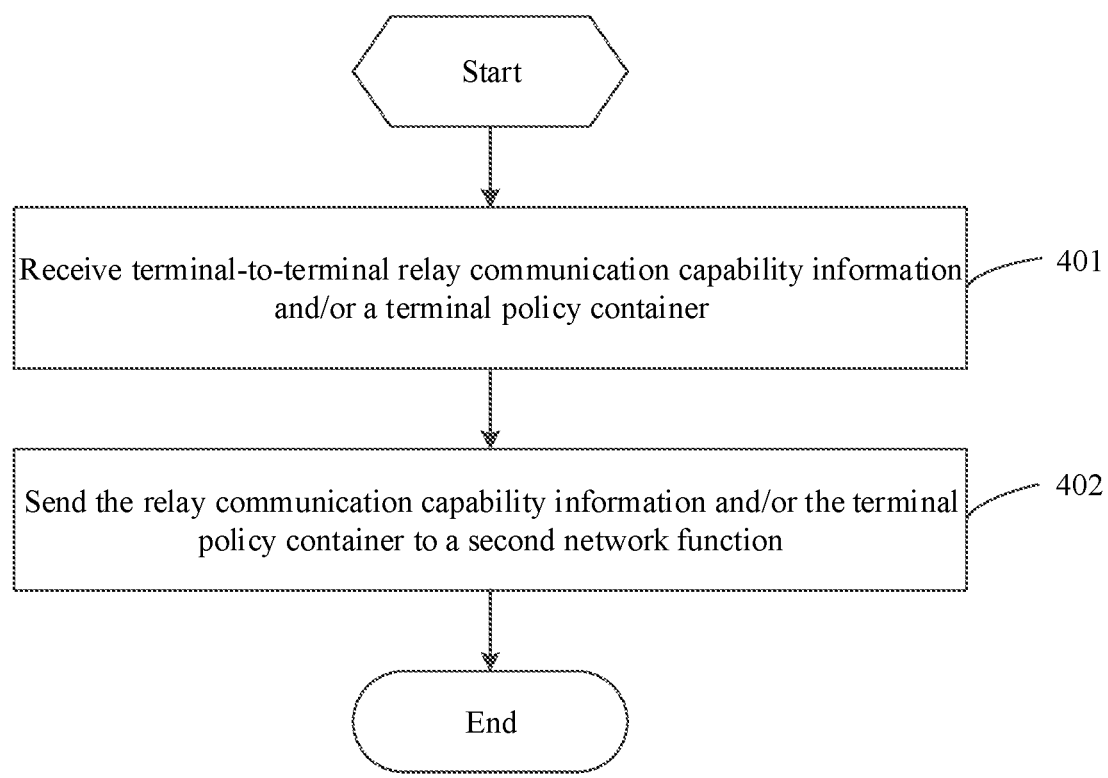
FIG. 4 is a schematic flowchart 4 of an authorization and policy parameter configuration method according to an embodiment of the present invention.

As shown in FIG. 4, an embodiment of the present invention provides an authorization and policy parameter configuration method, which is applied to a first network function. The method includes the following steps.

Step 401: Receive terminal-to-terminal relay communication capability information and/or a terminal policy container.

In this embodiment, the first network function may be an AMF, and a terminal sends the terminal-to-terminal relay communication capability information and/or the terminal policy container to the AMF. The AMF may determine, based on the relay communication capability information and/or the terminal policy container provided by the terminal, and subscription information of the terminal, whether the terminal authorizes UE-to-UE relay communication.

Step 402: Send the relay communication capability information and/or the terminal policy container to a second network function.

The first network function (AMF) sends the relay communication capability information and/or the terminal policy container to the second network function (PCF), so that the second network function generates an authorization and policy/parameter for the UE-to-UE relay communication of the terminal based on the relay communication capability information and/or the terminal policy container.

Optionally, the relay communication capability information and the terminal policy container may be provided by the terminal by using a registration request message. Specifically, step 401 includes:

receiving a registration request message from the terminal, where the registration request message carries the relay communication capability information, and the relay communication capability information includes: capability information indicating that the terminal is capable of serving as a relay terminal, and/or capability information indicating that the terminal is capable of performing relay communication.

The first network function receives the UE-to-UE relay communication capability information provided by the terminal in a registration process. For UE-to-UE relay UE in UE-to-UE relay communication, the registration request message carries capability information indicating that the terminal is capable of serving as the UE-to-UE relay UE. For non-relay UE in UE-to-UE relay communication, the registration request message needs to carry capability information indicating that the terminal is capable of performing the UE-to-UE relay communication.

Optionally, the registration request message further carries the terminal policy container; and the terminal policy container carries terminal-to-terminal relay communication policy or parameter indication information.

If the terminal does not currently have an available authorization and policy parameter for the UE-to-UE relay communication, the terminal may include, in the registration request message, a UE policy container carrying a UE-to-UE relay communication indication, to request the authorization and policy parameter for relay communication.

After the receiving a registration request message from the terminal, the method further includes: determining, based on subscription information of the terminal, whether the terminal authorizes terminal-to-terminal relay communication; and storing the relay communication capability information and the subscription information when the authorization is successful.

After receiving the registration request message from the terminal, the first network function (AMF) performs authorization determining based on the subscription information of the UE, that is, determines whether the UE authorizes UE-to-UE relay communication. When the terminal is a non-relay terminal, if the terminal authorizes the UE-to-UE relay communication, the relay communication capability information and the subscription information are stored, that is, the AMF stores the relay communication capability information reported by the terminal and the subscription information into a UE context.

When the terminal is a relay terminal, it is further required to determine, based on the subscription information, whether the terminal is authorized to be a relay terminal. When the terminal authorizes the terminal-to-terminal relay communication, and the terminal is authorized to be a relay terminal, the relay communication capability information and the subscription information are stored, that is, the AMF stores the relay communication capability information reported by the terminal and the subscription information into a UE context.

Optionally, step 402 includes: sending the relay communication capability information to the second network function in an access and mobility management policy association establishment or update process.

The first network function (AMF) provides the relay communication capability information to the second network function (PCF) in the access and mobility management policy association establishment/update process. In this way, based on the relay communication capability information provided by the AMF and the subscription information of the UE, the PCF generates the authorization and policy parameter for the UE-to-UE relay communication of the UE, and provides the authorization and policy parameter to the UE through a UE configuration update process.

Optionally, if the registration request message further carries, in addition to the relay communication capability information, a UE policy container that is provided by the terminal and that carries a UE-to-UE relay communication indication, step 402 includes: sending the relay communication capability information and the terminal policy container to the second network function in an access and mobility management policy association establishment or update process.

In this embodiment, the first network function sends the relay communication capability information and the terminal policy container to the second network function in the access and mobility management policy association establishment or update process, so that the PCF generates the authorization and policy parameter for the UE-to-UE relay communication of the UE based on the relay communication capability information provided by the AMF, the UE policy container carrying the UE-to-UE relay communication indication, and the subscription information of the UE, and provides the authorization and policy parameter to the UE through a UE configuration update process.

When the terminal does not have a valid authorization and policy parameter for the UE-to-UE relay communication, for example, an authorization and policy parameter timer for the terminal-to-terminal relay communication of the terminal expires, or an authorization and policy parameter for the terminal-to-terminal relay communication of the terminal is invalid (lost or invalid due to other exceptions), the terminal initiates an authorization and policy/parameter configuration process for the UE-to-UE relay communication. Specifically, step 401 may include:

receiving a policy configuration request message from the terminal, where the policy configuration request message carries the terminal policy container; and the terminal policy container carries terminal-to-terminal relay communication policy or parameter indication information.

When the terminal does not have a valid authorization and policy parameter for the UE-to-UE relay communication, the terminal may include the UE policy container carrying the UE-to-UE relay communication policy/parameter indication in the policy configuration request message, and send the policy configuration request message to the first network function. Optionally, the first network function sends a terminal policy control update request to the second network function, where the terminal policy control update request includes the terminal policy container, so that the second network function (PCF) generates the authorization and policy parameter for the UE-to-UE relay communication of the UE based on the subscription information of the UE and the terminal policy container, and provides the authorization and policy parameter to the UE through the UE configuration update process.

In this embodiment of the present invention, after receiving the relay communication capability information provided by the terminal, the first network function sends the relay communication capability information to the second network function, so that the second network function generates the authorization and policy parameter for relay communication based on the relay communication capability information, and the terminal can perform authorized discovery and connection establishment for a UE-to-UE relay based on the authorization and policy parameter.

Figure 5:
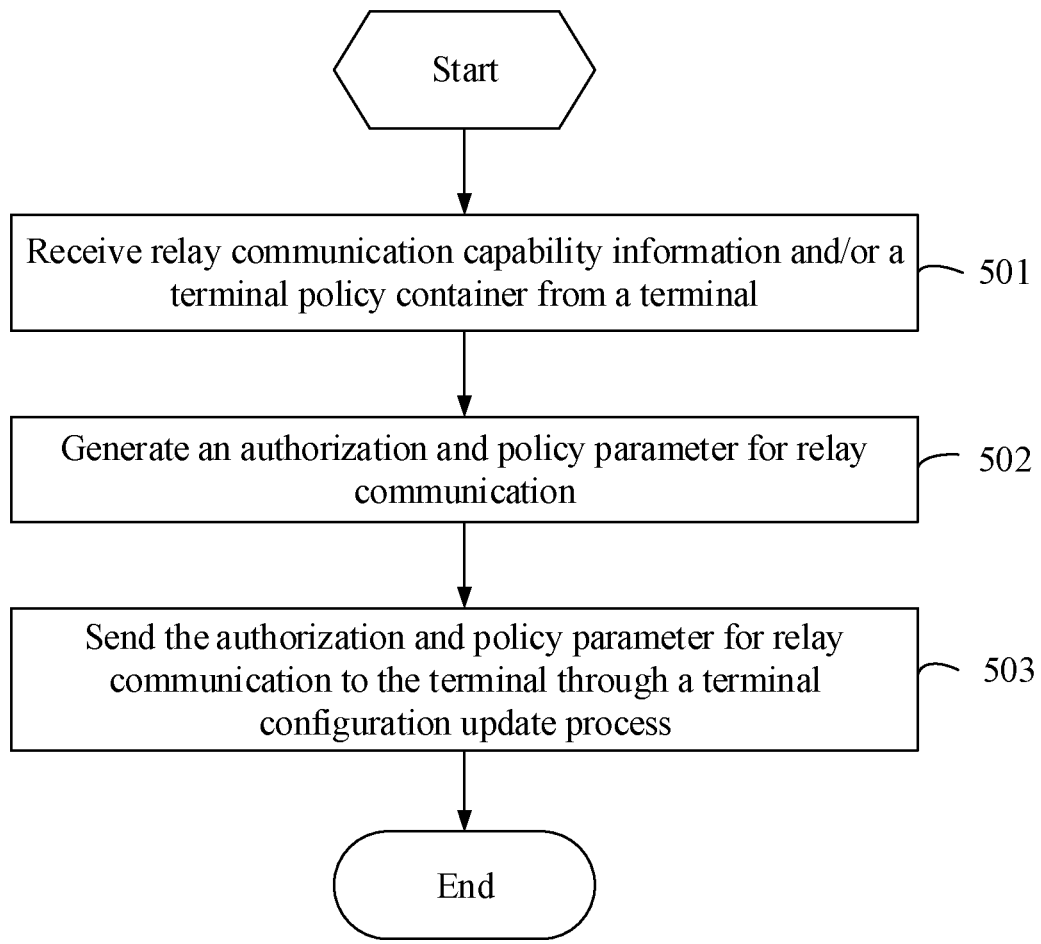
FIG. 5 is a schematic flowchart 5 of an authorization and policy parameter configuration method according to an embodiment of the present invention.

As shown in FIG. 5, an embodiment of the present invention provides an authorization and policy parameter configuration method, which is applied to a second network function. The method includes the following steps.

Step 501: Receive relay communication capability information and/or a terminal policy container from a terminal.

The second network function may be a PCF, and the relay communication capability information and/or the terminal policy container are provided by the terminal to a first network function (AMF). The AMF then sends the relay communication capability information and/or the terminal policy container to the second network function (PCF).

Step 502: Generate an authorization and policy parameter for relay communication. The second network function (PCF) generates the authorization and policy/parameter for the UE-to-UE relay communication of the terminal based on the relay communication capability information, the terminal policy container, and subscription information of the terminal.

Step 503: Send the authorization and policy parameter for relay communication to the terminal through a terminal configuration update process.

The second network function (PCF) sends the generated authorization and policy parameter for relay communication to the terminal through the UE configuration update process, so that the terminal can perform authorized discovery and connection establishment for a UE-to-UE relay based on the authorization and policy parameter.

Optionally, step 501 includes: receiving the relay communication capability information in an access and mobility management policy association establishment or update process. The second network function (PCF) receives the relay communication capability information provided by the first network function (AMF) in the access and mobility management policy association establishment/update process.

Optionally, if the terminal further provides, in addition to the relay communication capability information, a UE policy container carrying a UE-to-UE relay communication indication in a registration request message sent to the first network function, step 501 includes: receiving the relay communication capability information and the terminal policy container in an access and mobility management policy association establishment or update process.

Specifically, the relay communication capability information may include: capability information indicating that the terminal is capable of serving as a relay terminal, and/or capability information indicating that the terminal is capable of performing relay communication.

The relay communication capability information may be provided by the terminal to the first network function (AMF) by using the registration request message, and the first network function (AMF) sends the relay communication capability information to the second network function (PCF) in the access and mobility management policy association establishment or update process. For UE-to-UE relay UE in UE-to-UE relay communication, the registration request message carries capability information indicating that the terminal is capable of serving as the UE-to-UE relay UE. For non-relay UE in UE-to-UE relay communication, the registration request message needs to carry capability information indicating that the terminal is capable of performing the UE-to-UE relay communication.

Optionally, the receiving the terminal policy container includes: receiving a terminal policy control update request, where the terminal policy control update request includes the terminal policy container; and the terminal policy container carries terminal-to-terminal relay communication policy or parameter indication information.

In this embodiment, if the terminal does not currently have an available authorization and policy parameter for the UE-to-UE relay communication, the terminal includes a UE policy container carrying the UE-to-UE relay communication indication in a policy configuration request message.

When the terminal policy container is carried in the registration request message, the first network function (AMF) sends the terminal policy container to the second network function (PCF) through the access and mobility management policy association establishment or update process. When the terminal policy container is carried in the policy configuration request message, the first network function (AMF) sends the terminal policy container to the second network function (PCF) by using the terminal policy control update request.

Specifically, for the UE-to-UE relay UE in the UE-to-UE relay communication, that is, when the terminal is a relay terminal, the authorization and policy parameter for relay communication may include at least one of the following:
  an authorization policy for serving as a terminal-to-terminal relay, such as public land mobile network (PLMN) information for authorizing as the relay UE for the UE-to-UE relay communication;
  a terminal-to-terminal relay discovery policy or parameter, such as a UE-to-UE relay service code or service identifier for identifying a connection service provided by the UE-to-network relay;
  a terminal-to-terminal relay communication policy or parameter, such as a quality of service (QoS) parameter for the UE-to-UE relay communication; or
  a security parameter in the terminal-to-terminal relay communication, including security parameter information in a UE-to-UE relay discovery process and a UE-to-UE relay communication connection establishment process.

Specifically, for the non-relay UE in the UE-to-UE relay communication, that is, when the terminal is a non-relay terminal, the authorization and policy parameter for relay communication may include at least one of the following:
  an authorization policy for enabling terminal-to-terminal relay communication, such as PLMN information for authorizing the UE-to-UE relay communication;
  a terminal-to-terminal relay discovery policy or parameter, such as a UE-to-UE relay service code or service identifier;
  a terminal-to-terminal relay communication policy or parameter, such as a QoS parameter for the UE-to-UE relay communication;
  a selection policy for a relay terminal in the terminal-to-terminal relay communication, for selection and reselection of the relay UE in the UE-to-UE relay discovery or UE-to-UE relay communication; or
  a security parameter in the terminal-to-terminal relay communication, including security parameter information in a UE-to-UE relay discovery process and a UE-to-UE relay communication connection establishment process.

In this embodiment of the present invention, the second network function generates the authorization and policy parameter for relay communication based on the relay communication capability information of the terminal and the subscription information of the terminal, and provides the authorization and policy parameter to the terminal through the terminal configuration update process, so that the terminal can perform authorized discovery and connection establishment for a UE-to-UE relay based on the authorization and policy/parameter configuration.

Figure 6:
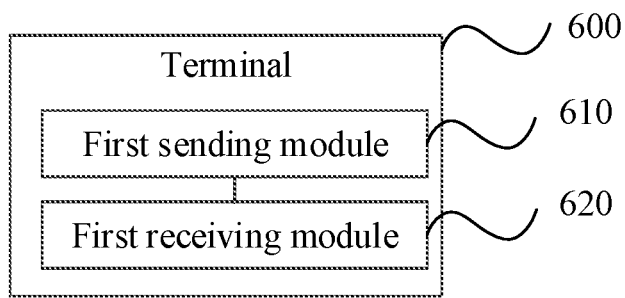
FIG. 6 is a schematic modular diagram of a terminal according to an embodiment of the present invention.
Figure 7:
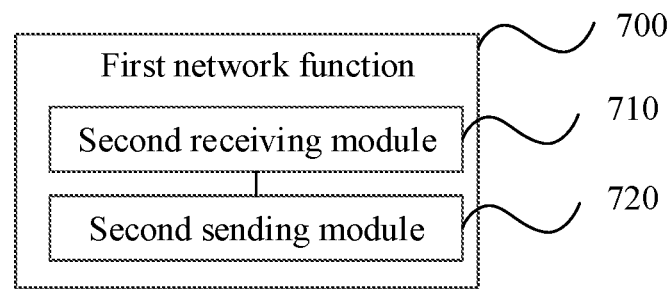
FIG. 7 is a schematic modular diagram of a first network function according to an embodiment of the present invention.
Figure 8:
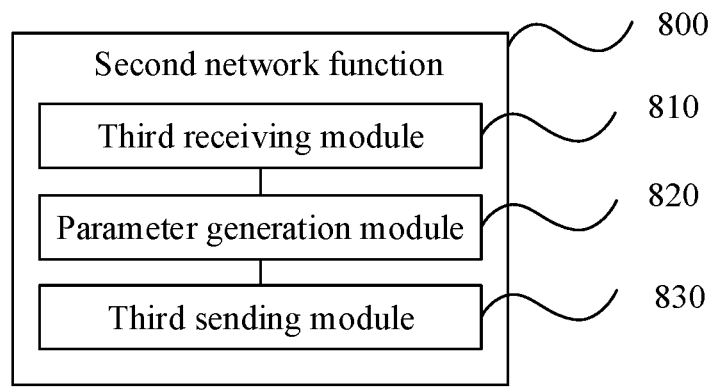
FIG. 8 is a schematic modular diagram of a second network function according to an embodiment of the present invention.

As shown in FIG. 6, an embodiment of the present invention provides a terminal 600, including:

a first sending module 610, configured to send terminal-to-terminal relay communication capability information and/or a terminal policy container to a first network function; and a first receiving module 620, configured to receive an authorization and policy parameter for relay communication sent by a second network function, where the authorization and policy parameter for relay communication is generated based on the relay communication capability information and/or the terminal policy container.

Optionally, the first sending module 610 is specifically configured to:

send a registration request message to the first network function, where the registration request message carries the relay communication capability information, and the relay communication capability information includes: capability information indicating that the terminal is capable of serving as a relay terminal, and/or capability information indicating that the terminal is capable of performing relay communication.

Optionally, the registration request message further carries the terminal policy container; and the terminal policy container carries terminal-to-terminal relay communication policy or parameter indication information.

Optionally, the first sending module 610 is specifically configured to: when a trigger condition is satisfied, send a policy configuration request message to the first network function, where the policy configuration request message carries the terminal policy container; and the terminal policy container carries terminal-to-terminal relay communication policy or parameter indication information.

Optionally, the trigger condition includes at least one of the following:

an authorization and policy parameter timer for the terminal-to-terminal relay communication of the terminal expires; or an authorization and policy parameter for the terminal-to-terminal relay communication of the terminal is invalid.

Optionally, when the terminal is a relay terminal, the authorization and policy parameter for relay communication includes at least one of the following:

an authorization policy for serving as a terminal-to-terminal relay;

a terminal-to-terminal relay discovery policy or parameter;

a terminal-to-terminal relay communication policy or parameter; or a security parameter in the terminal-to-terminal relay communication.

Optionally, when the terminal is a non-relay terminal, the authorization and policy parameter for relay communication includes at least one of the following:

an authorization policy for enabling terminal-to-terminal relay communication;

a terminal-to-terminal relay discovery policy or parameter;

a terminal-to-terminal relay communication policy or parameter;

a selection policy for a relay terminal in the terminal-to-terminal relay communication; or a security parameter in the terminal-to-terminal relay communication.

It should be noted that this terminal embodiment is a terminal corresponding to the authorization and policy parameter configuration method applied to the terminal. All implementations of the foregoing embodiment are applicable to the terminal embodiment and can achieve the same technical effects.

In this embodiment of the present invention, the terminal provides the terminal-to-terminal relay communication capability information to the network function, so that the network function determines the authorization and policy parameter for relay communication based on the relay communication capability information. Through an authorization and policy/parameter configuration for relay communication, the terminal can perform authorized discovery and connection establishment for a UE-to-UE relay based on the authorization and policy/parameter configuration.

An embodiment of the present invention provides a network function, which is a first network function 700, including:

a second receiving module 710, configured to receive terminal-to-terminal relay communication capability information and/or a terminal policy container; and a second sending module 720, configured to send the relay communication capability information and/or the terminal policy container to a second network function.

Optionally, the second receiving module 710 is specifically configured to:

receive a registration request message from a terminal, where the registration request message carries the relay communication capability information, and the relay communication capability information includes: capability information indicating that the terminal is capable of serving as a relay terminal, and/or capability information indicating that the terminal is capable of performing relay communication.

Optionally, the registration request message further carries the terminal policy container; and the terminal policy container carries terminal-to-terminal relay communication policy or parameter indication information.

Optionally, the network function further includes:

a first determining module, configured to determine, based on subscription information of the terminal, whether the terminal authorizes terminal-to-terminal relay communication; and a storage module, configured to store the relay communication capability information and the subscription information when the authorization is successful.

Optionally, when the terminal is a relay terminal, the network function further includes:

a second determining module, configured to: when the terminal is a relay terminal, determine, based on the subscription information, whether the terminal is authorized to be a relay terminal.

The storage module is specifically configured to: store the relay communication capability information and the subscription information when the terminal authorizes terminal-to-terminal relay communication, and the terminal is authorized to be a relay terminal.

Optionally, the second sending module 720 is specifically configured to: send the relay communication capability information to the second network function in an access and mobility management policy association establishment or update process.

Optionally, the second sending module 720 is further configured to: send the relay communication capability information and the terminal policy container to the second network function in an access and mobility management policy association establishment or update process.

Optionally, the second receiving module 710 is specifically configured to: receive a policy configuration request message from the terminal, where the policy configuration request message carries the terminal policy container; and the terminal policy container carries terminal-to-terminal relay communication policy or parameter indication information.

Optionally, the second sending module 720 is specifically configured to: send a terminal policy control update request to the second network function, where the terminal policy control update request includes the terminal policy container.

It should be noted that the first network function is a network function entity device on a network side. The network function embodiment is a network function corresponding to the authorization and policy parameter configuration method applied to the first network function. All implementations of the foregoing embodiment are applicable to the network function embodiment and can achieve the same technical effects.

In this embodiment of the present invention, after receiving the relay communication capability information provided by the terminal, the first network function sends the relay communication capability information to the second network function, so that the second network function generates the authorization and policy parameter for relay communication based on the relay communication capability information, and the terminal can perform authorized discovery and connection establishment for a UE-to-UE relay based on the authorization and policy parameter.

An embodiment of the present invention further provides a network function, which is a second network function 800, including:
  a third receiving module 810, configured to receive relay communication capability information and/or a terminal policy container from a terminal;
  a parameter generation module 820, configured to generate an authorization and policy parameter for relay communication; and
  a third sending module 830, configured to send the authorization and policy parameter for relay communication to the terminal through a terminal configuration update process.

Optionally, the third receiving module 810 is specifically configured to: receive the relay communication capability information in an access and mobility management policy association establishment or update process.

Optionally, the third receiving module 810 is specifically configured to: receive the relay communication capability information and the terminal policy container in an access and mobility management policy association establishment or update process.

Optionally, the relay communication capability information includes: capability information indicating that the terminal is capable of serving as a relay terminal, and/or capability information indicating that the terminal is capable of performing relay communication.

Optionally, the third receiving module 810 is specifically configured to: receive a terminal policy control update request, where the terminal policy control update request includes the terminal policy container; and the terminal policy container carries terminal-to-terminal relay communication policy or parameter indication information.

Optionally, when the terminal is a relay terminal, the authorization and policy parameter for relay communication includes at least one of the following:
  an authorization policy for serving as a terminal-to-terminal relay;
  a terminal-to-terminal relay discovery policy or parameter;
  a terminal-to-terminal relay communication policy or parameter; or
  a security parameter in the terminal-to-terminal relay communication.

Optionally, when the terminal is a non-relay terminal, the authorization and policy parameter for relay communication includes at least one of the following:
  an authorization policy for enabling terminal-to-terminal relay communication;
  a terminal-to-terminal relay discovery policy or parameter;
  a terminal-to-terminal relay communication policy or parameter;
  a selection policy for a relay terminal in the terminal-to-terminal relay communication; or
  a security parameter in the terminal-to-terminal relay communication.

It should be noted that the second network function is a network function entity device on a network side. The network function embodiment is a network function corresponding to the authorization and policy parameter configuration method applied to the second network function. All implementations of the foregoing embodiment are applicable to the network function embodiment and can achieve the same technical effects.

In this embodiment of the present invention, the second network function generates the authorization and policy parameter for relay communication based on the relay communication capability information of the terminal and the subscription information of the terminal, and provides the authorization and policy parameter to the terminal through the terminal configuration update process, so that the terminal can perform authorized discovery and connection establishment for a UE-to-UE relay based on the authorization and policy/parameter configuration.

Figure 9:
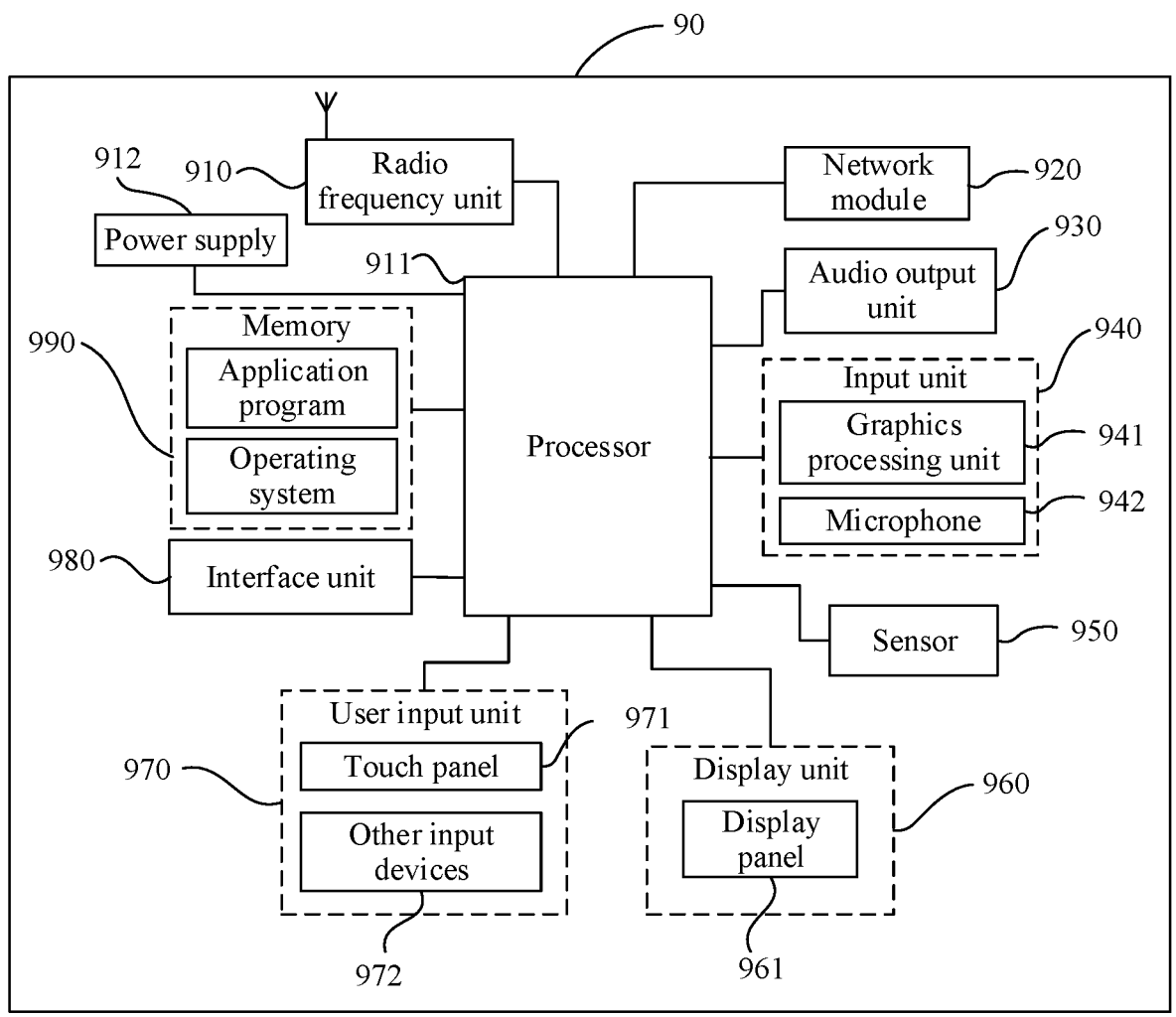
FIG. 9 is a structural block diagram of a terminal according to an embodiment of the present invention.

FIG. 9 is a schematic diagram of a hardware structure of a terminal implementing an embodiment of the present invention.

The terminal 90 includes but is not limited to components such as a radio frequency unit 910, a network module 920, an audio output unit 930, an input unit 940, a sensor 950, a display unit 960, a user input unit 970, an interface unit 980, a memory 990, a processor 911, and a power supply 912. Those skilled in the art may understand that the terminal structure shown in FIG. 9 does not constitute a limitation to the terminal. The terminal may include more or fewer components than those shown in the figure, or some components may be combined, or there may be a different component arrangement. In this embodiment of the present invention, the terminal includes but is not limited to a mobile phone, a tablet computer, a laptop computer, a palmtop computer, a vehicle-mounted mobile terminal, a wearable device, a pedometer, or the like.

The radio frequency unit 910 is configured to send terminal-to-terminal relay communication capability information and/or a terminal policy container to a first network function; and receive an authorization and policy parameter for relay communication sent by a second network function, where the authorization and policy parameter for relay communication is generated based on the relay communication capability information and/or the terminal policy container.

It should be understood that, in this embodiment of the present invention, the radio frequency unit 910 may be configured to receive and transmit information, or receive and transmit signals during a call. Specifically, the radio frequency unit 910 receives downlink data from a network side device, and transmits the downlink data to the processor 911 for processing; and in addition, transmits uplink data to the network side device. Generally, the radio frequency unit 910 includes, but is not limited to, an antenna, at least one amplifier, a transceiver, a coupler, a low noise amplifier, a duplexer, and the like. In addition, the radio frequency unit 910 may further communicate with another device by using a wireless communications system and network.

The terminal provides a user with wireless broadband Internet access through the network module 920, for example, helps the user send and receive emails, browse web pages, and access streaming media.

The audio output unit 930 may convert audio data received by the radio frequency unit 910 or the network module 920 or stored in the memory 990 into an audio signal and output the audio signal as a sound. In addition, the audio output unit 930 may further provide audio output (for example, a call signal reception tone or a message reception tone) that is related to a specific function performed by the terminal 90. The audio output unit 930 includes a speaker, a buzzer, a telephone receiver, and the like.

The input unit 940 is configured to receive audio or video signals. The input unit 940 may include a graphics processing unit (GPU) 941 and a microphone 942. The graphics processing unit 941 processes image data of a static image or a video obtained by an image capturing apparatus (for example, a camera) in a video capturing mode or an image capturing mode. A processed image frame can be displayed on the display unit 960. The image frame processed by the graphics processing unit 941 can be stored in the memory 990 (or another storage medium) or transmitted via the radio frequency unit 910 or the network module 920. The microphone 942 may receive sound and can process such sound into audio data. The processed audio data may be converted, in a telephone call mode, into a format that can be transmitted to a mobile communications network side device via the radio frequency unit 910 for output.

The terminal 90 further includes at least one sensor 950, such as an optical sensor, a motion sensor, and another sensor. Specifically, the optical sensor includes an ambient light sensor and a proximity sensor, where the ambient light sensor can adjust brightness of the display panel 961 based on luminance of ambient light, and the proximity sensor can turn off the display panel 961 and/or backlight when the terminal 90 moves towards an ear. As a type of motion sensor, an accelerometer sensor can detect magnitudes of accelerations in all directions (usually three axes), can detect a magnitude and a direction of gravity when the mobile phone is in a static state, and can be applied to terminal posture recognition (such as screen switching between portrait and landscape, related games, and magnetometer posture calibration), functions related to vibration recognition (such as pedometer and tapping), and the like. The sensor 950 may also include a fingerprint sensor, a pressure sensor, an iris sensor, a molecular sensor, a gyroscope, a barometer, a hygrometer, a thermometer, an infrared sensor, and the like. Details are not described herein.

The display unit 960 is configured to display information input by the user or information provided for the user. The display unit 960 may include the display panel 961, and the display panel 961 may be configured in a form of liquid crystal display (LCD), organic light-emitting diode (OLED), or the like.

The user input unit 970 may be configured to receive input digit or character information and generate key signal input related to user settings and function control of the terminal. Specifically, the user input unit 970 includes a touch panel 971 and other input devices 972. The touch panel 971, also referred to as a touchscreen, may capture a touch operation performed by a user on or near the touch panel 971 (for example, an operation performed by a user on the touch panel 971 or near the touch panel 971 by using any appropriate object or accessory such as a finger or a stylus). The touch panel 971 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, and transmits the touch point coordinates to the processor 911, and can receive and execute a command transmitted by the processor 911. In addition, the touch panel 971 may be implemented in various types such as resistive, capacitive, infrared, and surface acoustic wave. In addition to the touch panel 971, the user input unit 970 may further include the other input devices 972. Specifically, the other input devices 972 may include but are not limited to at least one of a physical keyboard, a functional button (such as a volume control button or a power on/off button), a trackball, a mouse, and a joystick. Details are not described herein.

Further, the touch panel 971 may cover the display panel 961. When detecting a touch operation on or near the touch panel 971, the touch panel 971 transmits the touch operation to the processor 911 to determine a type of a touch event. Then the processor 911 provides corresponding visual output on the display panel 961 based on the type of the touch event. In FIG. 9, the touch panel 971 and the display panel 961 are used as two independent components to implement input and output functions of the terminal. However, in some embodiments, the touch panel 971 and the display panel 961 may be integrated to implement the input and output functions of the terminal. This is not specifically limited herein.

The interface unit 980 is an interface connecting an external apparatus to the terminal 90. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, an earphone port, or the like. The interface unit 980 may be configured to receive an input (for example, data information and power) from the external apparatus and transmit the received input to one or more elements within the terminal 90, or may be configured to transmit data between the terminal 90 and the external apparatus.

The memory 990 may be configured to store software programs and various data. The memory 990 may mainly include a program storage area and a data storage area. The program storage area may store an operating system, an application program required by at least one function (for example, an audio playing function and an image playing function), and the like. The data storage area may store data (for example, audio data and an address book) created according to use of the mobile phone. In addition, the memory 940 may include a high-speed random access memory, and may further include a non-volatile memory, for example, at least one magnetic disk storage device, a flash storage device, or another volatile solid-state storage device.

The processor 911 is a control center of the terminal, and connects all parts of the entire terminal by using various interfaces and lines. By running or executing a software program and/or a module stored in the memory 990 and invoking data stored in the memory 990, the processor 911 performs various functions of the terminal and data processing, so as to perform overall monitoring on the terminal. The processor 911 may include one or more processing units. Preferably, the processor 911 may integrate an application processor and a modem processor. The application processor mainly processes an operating system, a user interface, an application program, and the like. The modem processor mainly processes wireless communication. It should be understood that alternatively, the modem processor may not be integrated into the processor 911.

The terminal 90 may further include the power supply 912 (for example, a battery) that supplies power to various components. Preferably, the power supply 912 may be logically connected to the processor 911 through a power supply management system, so that functions such as charging and discharging management and power consumption management are implemented by using the power management system.

In addition, the terminal 90 includes some function modules that are not shown. Details are not described herein again.

Preferably, an embodiment of the present invention further provides a terminal, including a processor 911, a memory 990, and a computer program stored on the memory 990 and executable on the processor 911. When the computer program is executed by the processor 911, the processes of the foregoing authorization and policy parameter configuration method embodiment applied to the terminal are implemented, with the same technical effects achieved. To avoid repetition, details are not described herein again.

An embodiment of the present invention further provides a computer-readable storage medium. The computer-readable storage medium stores a computer program, and when the computer program is executed by a processor, the processes of the foregoing authorization and policy parameter configuration method embodiment applied to the terminal are implemented, with the same technical effects achieved. To avoid repetition, details are not described herein again. The computer-readable storage medium is, for example, a read-only memory (ROM), a random access memory (RAM), a magnetic disk, an optical disc, or the like.

Figure 10:
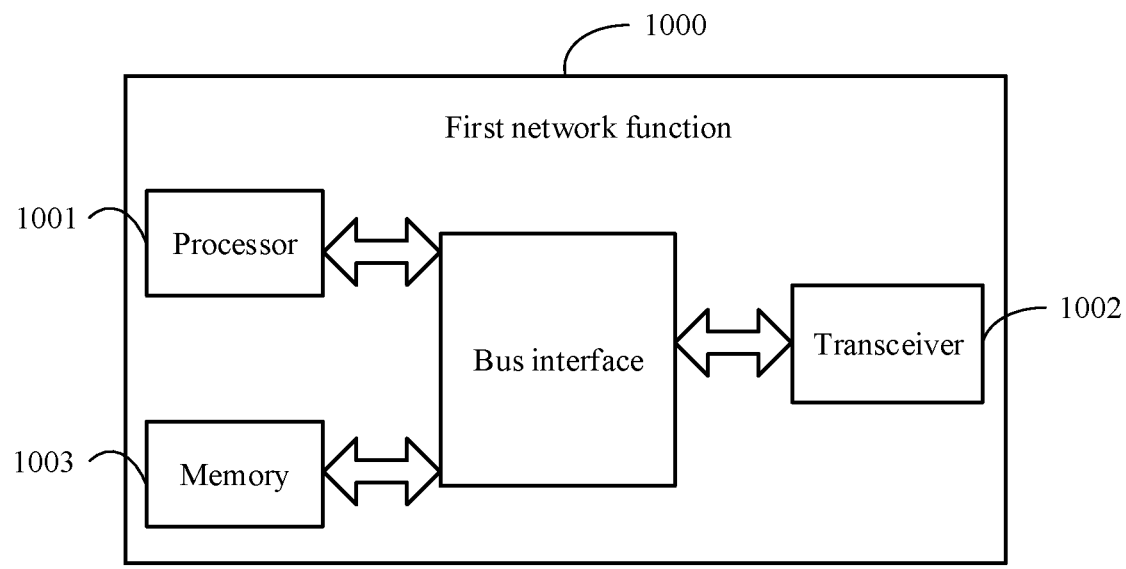
FIG. 10 is a structural block diagram of a first network function according to an embodiment of the present invention.

FIG. 10 is a structural diagram of a network function according to an embodiment of the present invention, which can implement details of the foregoing authorization and policy parameter configuration method applied to the first network function, with the same technical effects achieved.

As shown in FIG. 10, the first network function 1000 includes: a processor 1001, a transceiver 1002, a memory 1003, and a bus interface.

The transceiver 1002 is configured to: receive terminal-to-terminal relay communication capability information and/or a terminal policy container; and send the relay communication capability information and/or the terminal policy container to a second network function.

In FIG. 10, a bus architecture may include any number of interconnected buses and bridges, and link together one or more processors specifically represented by the processor 1001 and various circuits of a memory represented by the memory 1003. The bus architecture may further link together various other circuits, such as a peripheral device, a voltage regulator, and a power management circuit, which are well known in the art and therefore are not further described herein. A bus interface provides an interface. The transceiver 1002 may be a plurality of elements, including a transmitter and a receiver, and provides units for communicating with a variety of other apparatuses over a transmission medium.

Optionally, when receiving the terminal-to-terminal relay communication capability information, the transceiver 1002 is specifically configured to:

receive a registration request message from a terminal, where the registration request message carries the relay communication capability information, and the relay communication capability information includes: capability information indicating that the terminal is capable of serving as a relay terminal, and/or capability information indicating that the terminal is capable of performing relay communication.

Optionally, the registration request message further carries the terminal policy container; and the terminal policy container carries terminal-to-terminal relay communication policy or parameter indication information.

Optionally, the processor 1001 is configured to read a program in the memory 1003 and perform the following processes:

determining, based on subscription information of the terminal, whether the terminal authorizes terminal-to-terminal relay communication; and the memory 1003 stores the relay communication capability information and the subscription information when the authorization is successful.

Optionally, when the terminal is a relay terminal, the processor 1001 is further configured to:

determine, based on the subscription information, whether the terminal is authorized to be a relay terminal; and the memory 1003 stores the relay communication capability information and the subscription information when the terminal authorizes terminal-to-terminal relay communication, and the terminal is authorized to be a relay terminal.

Optionally, when sending the relay communication capability information to the second network function, the transceiver 1002 is specifically configured to:

send the relay communication capability information to the second network function in an access and mobility management policy association establishment or update process.

Optionally, the transceiver 1002 is further configured to: send the relay communication capability information and the terminal policy container to the second network function in an access and mobility management policy association establishment or update process.

Optionally, when receiving the terminal policy container, the transceiver 1002 is specifically configured to:
 receive a policy configuration request message from the terminal, where the policy configuration request message carries the terminal policy container; and
 the terminal policy container carries terminal-to-terminal relay communication policy or parameter indication information.

Optionally, when sending the terminal policy container to the second network function, the transceiver 1002 is specifically configured to:
 send a terminal policy control update request to the second network function, where the terminal policy control update request includes the terminal policy container.

The network function may be a base transceiver station (BTS) in global system for mobile communications (GSM) or code division multiple access (CDMA), or may be a NodeB (NB) in wideband code division multiple access (WCDMA), or may further be an evolved NodeB (eNB or eNodeB) in LTE, or a relay station or an access point, or a base station in a future 5G network, or the like. This is not limited herein.

An embodiment of the present invention further provides a computer-readable storage medium. The computer-readable storage medium stores a computer program, and when the computer program is executed by a processor, the processes of the foregoing authorization and policy parameter configuration method embodiment applied to the first network function are implemented, with the same technical effects achieved. To avoid repetition, details are not described herein again. The computer-readable storage medium is, for example, a read-only memory (ROM), a random access memory (RAM), a magnetic disk, or an optical disc.

Figure 11:
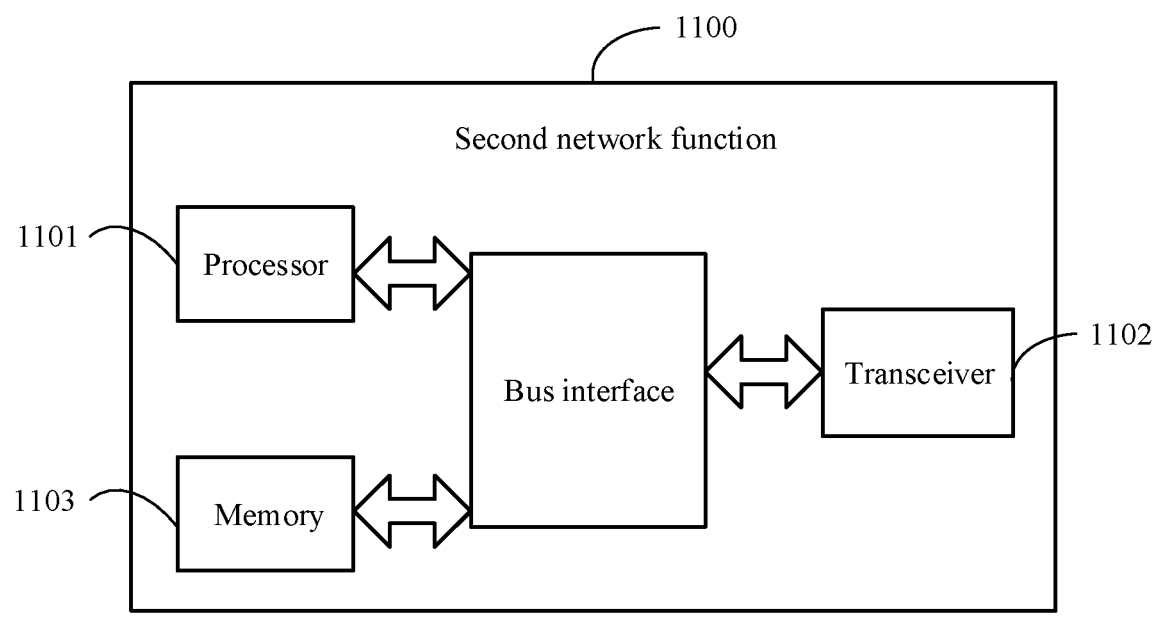
FIG. 11 is a structural block diagram of a second network function according to an embodiment of the present invention.

FIG. 11 is a structural diagram of a network function according to another embodiment of the present invention, which can implement details of the foregoing authorization and policy parameter configuration method applied to the second network function, with the same technical effects achieved. As shown in FIG. 11, the second network function 1100 includes: a processor 1101, a transceiver 1102, a memory 1103, and a bus interface.

The transceiver 1102 is configured to receive relay communication capability information and/or a terminal policy container from a terminal.

The processor 1101 is configured to generate an authorization and policy parameter for relay communication.

The transceiver 1102 is configured to send the authorization and policy parameter for relay communication to the terminal through a terminal configuration update process.

In FIG. 11, a bus architecture may include any number of interconnected buses and bridges, and link together one or more processors specifically represented by the processor 1101 and various circuits of a memory represented by the memory 1103. The bus architecture may further link together various other circuits, such as a peripheral device, a voltage regulator, and a power management circuit, which are well known in the art and therefore are not further described herein. A bus interface provides an interface. The transceiver 1102 may be a plurality of elements, including a transmitter and a receiver, and provides units for communicating with a variety of other apparatuses over a transmission medium.

Optionally, when receiving the relay communication capability information from the terminal, the transceiver 1102 is specifically configured to: receive the relay communication capability information in an access and mobility management policy association establishment or update process.

Optionally, the transceiver 1102 is further configured to receive the relay communication capability information and the terminal policy container in an access and mobility management policy association establishment or update process.

Optionally, the relay communication capability information includes:
 capability information indicating that the terminal is capable of serving as a relay terminal; and/or the capability information indicating that the terminal is capable of performing relay communication.

Optionally, when receiving the terminal policy container, the transceiver 1102 is specifically configured to receive a terminal policy control update request, where the terminal policy control update request includes the terminal policy container; and
 the terminal policy container carries terminal-to-terminal relay communication policy or parameter indication information.

Optionally, when the terminal is a relay terminal, the authorization and policy parameter for relay communication includes at least one of the following:
 an authorization policy for serving as a terminal-to-terminal relay;
 a terminal-to-terminal relay discovery policy or parameter;
 a terminal-to-terminal relay communication policy or parameter; or
 a security parameter in the terminal-to-terminal relay communication.

Optionally, when the terminal is a non-relay terminal, the authorization and policy parameter for relay communication includes at least one of the following:
 an authorization policy for enabling terminal-to-terminal relay communication;
 a terminal-to-terminal relay discovery policy or parameter;
 a terminal-to-terminal relay communication policy or parameter;
 a selection policy for a relay terminal in the terminal-to-terminal relay communication; or
 a security parameter in the terminal-to-terminal relay communication.

The network function may be a base transceiver station (BTS) in global system for mobile communications (GSM) or code division multiple access (CDMA), or may be a NodeB (NB) in wideband code division multiple access (WCDMA), or may further be an evolved NodeB (eNB or eNodeB) in LTE, or a relay station or an access point, or a base station in a future 5G network, or the like. This is not limited herein.

An embodiment of the present invention further provides a computer-readable storage medium. The computer-readable storage medium stores a computer program, and when the computer program is executed by a processor, the processes of the foregoing authorization and policy parameter configuration method embodiment applied to the second network function are implemented, with the same technical effects achieved. To avoid repetition, details are not described herein again. The computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present invention essentially or the part contributing to the prior art may be implemented in the form of a software product. The computer software product is stored in a storage medium (such as a ROM/RAM, a magnetic disk, or an optical disc), and includes several instructions for instructing a terminal (which may be a mobile phone, a computer, a server, an air conditioner, a network side device, or the like) to perform the methods described in the embodiments of the present invention.

The foregoing descriptions are merely preferred implementations of the present invention. It should be noted that those of ordinary skill in the art may further make some improvements and refinements without departing from the principle of the present invention, and these improvements and refinements also fall within the scope of protection of the present invention.

What is claimed is:

1. An authorization and policy parameter configuration method, performed by a terminal, wherein the method comprises:
    sending a terminal policy container to a first network function, or, sending terminal-to-terminal relay communication capability information and a terminal policy container to a first network function; and
    receiving an authorization and policy parameter for relay communication sent by a second network function, wherein the authorization and policy parameter for relay communication is generated based on the terminal policy container, or, the authorization and policy parameter for relay communication is generated based on the relay communication capability information and the terminal policy container;
    wherein the sending a terminal policy container to a first network function comprises:
    when a trigger condition is satisfied, sending a policy configuration request message to the first network function, wherein the policy configuration request message carries the terminal policy container; and
    the terminal policy container carries terminal-to-terminal relay communication policy or parameter indication information.

2. The authorization and policy parameter configuration method according to claim 1, wherein the sending terminal-to-terminal relay communication capability information to a first network function comprises:
    sending a registration request message to the first network function, wherein the registration request message carries the relay communication capability information, and the relay communication capability information comprises: capability information indicating that the terminal is capable of serving as a relay terminal, and/or capability information indicating that the terminal is capable of performing relay communication.

3. The authorization and policy parameter configuration method according to claim 1, wherein the trigger condition comprises at least one of the following:
    an authorization and policy parameter timer for the terminal-to-terminal relay communication of the terminal expires; or
    an authorization and policy parameter for the terminal-to-terminal relay communication of the terminal is invalid.

4. The authorization and policy parameter configuration method according to claim 1, wherein when the terminal is a relay terminal, the authorization and policy parameter for relay communication comprises at least one of the following:
    an authorization policy for serving as a terminal-to-terminal relay;
    a terminal-to-terminal relay discovery policy or parameter;
    a terminal-to-terminal relay communication policy or parameter; or
    a security parameter in the terminal-to-terminal relay communication, or
    wherein when the terminal is a non-relay terminal, the authorization and policy parameter for relay communication comprises at least one of the following:
    an authorization policy for enabling terminal-to-terminal relay communication;
    a terminal-to-terminal relay discovery policy or parameter;
    a terminal-to-terminal relay communication policy or parameter;
    a selection policy for a relay terminal in the terminal-to-terminal relay communication; or
    a security parameter in the terminal-to-terminal relay communication.

5. An authorization and policy parameter configuration method, performed by a first network function, wherein the method comprises:
    receiving a terminal policy container, or, receiving terminal-to-terminal relay communication capability information and a terminal policy container; and
    sending the terminal policy container to a second network function, or, sending the relay communication capability information and the terminal policy container to a second network function;
    wherein the receiving a terminal policy container comprises:
    receiving a policy configuration request message from the terminal, wherein the policy configuration request message carries the terminal policy container; and
    the terminal policy container carries terminal-to-terminal relay communication policy or parameter indication information.

6. The authorization and policy parameter configuration method according to claim 5, wherein the receiving terminal-to-terminal relay communication capability information and/or a terminal policy container comprises:
    receiving a registration request message from a terminal, wherein the registration request message carries the relay communication capability information, and the relay communication capability information comprises: capability information indicating that the terminal is capable of serving as a relay terminal, and/or capability information indicating that the terminal is capable of performing relay communication.

7. The authorization and policy parameter configuration method according to claim 6, wherein after the receiving a registration request message from a terminal, the method further comprises:
   determining, based on subscription information of the terminal, whether the terminal authorizes terminal-to-terminal relay communication; and
   storing the relay communication capability information and the subscription information when the authorization is successful.

8. The authorization and policy parameter configuration method according to claim 7, wherein when the terminal is a relay terminal, the method further comprises:
   determining, based on the subscription information, whether the terminal is authorized to be a relay terminal; and
   the storing the relay communication capability information and the subscription information when the authorization is successful comprises:
   storing the relay communication capability information and the subscription information when the terminal authorizes terminal-to-terminal relay communication, and the terminal is authorized to be a relay terminal.

9. The authorization and policy parameter configuration method according to claim 5, wherein the sending the relay communication capability information to a second network function comprises:
   sending the relay communication capability information to the second network function in an access and mobility management policy association establishment or update process.

10. The authorization and policy parameter configuration method according to claim 5, wherein the sending the relay communication capability information and the terminal policy container to a second network function comprises:
    sending the relay communication capability information and the terminal policy container to the second network function in an access and mobility management policy association establishment or update process.

11. The authorization and policy parameter configuration method according to claim 5,
    wherein the sending the terminal policy container to a second network function comprises:
    sending a terminal policy control update request to the second network function, wherein the terminal policy control update request comprises the terminal policy container.

12. An authorization and policy parameter configuration method, performed by a network function, wherein the method comprises:
    receiving a terminal policy container from a terminal, or, receiving relay communication capability information and a terminal policy container;
    generating an authorization and policy parameter for relay communication; and
    sending the authorization and policy parameter for relay communication to the terminal through a terminal configuration update process;
    wherein the receiving a terminal policy container comprises:
    receiving a terminal policy control update request, wherein the terminal policy control update request comprises the terminal policy container; and
    the terminal policy container carries terminal-to-terminal relay communication policy or parameter indication information.

13. The authorization and policy parameter configuration method according to claim 12, wherein when the terminal is a relay terminal, the authorization and policy parameter for relay communication comprises at least one of the following:
    an authorization policy for serving as a terminal-to-terminal relay;
    a terminal-to-terminal relay discovery policy or parameter;
    a terminal-to-terminal relay communication policy or parameter; or
    a security parameter in the terminal-to-terminal relay communication, or
    wherein when the terminal is a non-relay terminal, the authorization and policy parameter for relay communication comprises at least one of the following:
    an authorization policy for enabling terminal-to-terminal relay communication;
    a terminal-to-terminal relay discovery policy or parameter;
    a terminal-to-terminal relay communication policy or parameter;
    a selection policy for a relay terminal in the terminal-to-terminal relay communication; or
    a security parameter in the terminal-to-terminal relay communication.

14. A terminal, comprising: a memory, a processor, and a program stored on the memory and executable on the processor, wherein when the program is executed by the processor, the processor is configured to perform the steps of the authorization and policy parameter configuration method according to claim 1.

15. A network function, comprising: a memory, a processor, and a program stored on the memory and executable on the processor, wherein when the program is executed by the processor, the processor is configured to perform the steps of the authorization and policy parameter configuration method according to claim 5.

16. A network function, comprising: a memory, a processor, and a program stored on the memory and executable on the processor, wherein when the program is executed by the processor, the processor is configured to perform the steps of the authorization and policy parameter configuration method according to claim 12.

* * * * *